US011994638B2

(12) United States Patent
Walker (10) Patent No.: US 11,994,638 B2
(45) Date of Patent: *May 28, 2024

(54) SYSTEMS AND METHODS FOR HIGH-RESOLUTION TRAVEL TIME AND MOVE-OUT VELOCITY ESTIMATION USING DOWNHOLE LINEAR RECEIVER ARRAYS (71) Applicant: Halliburton Energy Services, Inc., Houston, TX (US)

(72) Inventor: Kristoffer Thomas Walker, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 70 days.

This patent is subject to a terminal disclaimer.

(21) Appl. No.: 17/514,327

(22) Filed: Oct. 29, 2021

(65) Prior Publication Data
US 2022/0050220 A1  Feb. 17, 2022

Related U.S. Application Data (63) Continuation of application No. 16/484,507, filed as application No. PCT/US2018/063087 on Nov. 29, 2018, now Pat. No. 11,194,069.
(Continued)

(51) Int. Cl.
*G06F 11/30* (2006.01)
*E21B 47/0224* (2012.01)
(Continued)

(52) U.S. Cl.
CPC .......... *G01V 1/305* (2013.01); *E21B 47/0224* (2020.05); *G01V 1/50* (2013.01);
(Continued)

(58) Field of Classification Search
CPC ...................................................... G01V 1/305
See application file for complete search history.

(56) References Cited

U.S. PATENT DOCUMENTS

| 7,424,366 B2 | 9/2008 | Angelescu et al. |
| 2003/0144797 A1 | 7/2003 | Leaney |

(Continued)

FOREIGN PATENT DOCUMENTS

| EP | 2148216 | 7/2009 |
| WO | 2016097164 | 6/2016 |

(Continued)

OTHER PUBLICATIONS

ISRWO International Search Report and Written Opinion for PCT/US2018/063087 dated Mar. 8, 2019.
(Continued)

*Primary Examiner* — Phuong Huynh
(74) *Attorney, Agent, or Firm* — John Wustenberg; C. Tumey Law Group PLLC (57) ABSTRACT A method for borehole measurements may comprise receiving one or more signals from a linear receiver array, computing an arctan of a Hilbert Transform, isolating a first arriving energy, selecting a reference instantaneous phase on a reference receiver, finding the reference instantaneous phase for the linear receiver array, computing a relative travel time shift, combining a reference pick time with a relative time, and determining a travel time. A system for borehole measurements comprise a conveyance, a bottom hole assembly attached to the conveyance, a linear receiver array, wherein the linear receiver array is disposed on the bottom hole assembly, and a computer system connected to the linear receiver array.

20 Claims, 6 Drawing Sheets

Related U.S. Application Data (60) Provisional application No. 62/599,648, filed on Dec. 15, 2017.

(51) Int. Cl.
*G01V 1/30* (2006.01)
*G01V 1/50* (2006.01)
*G01V 3/26* (2006.01)
*G01V 3/38* (2006.01)

(52) U.S. Cl.
CPC .............. *G01V 3/26* (2013.01); *G01V 3/38* (2013.01); *G01V 2210/1299* (2013.01); *G01V 2210/41* (2013.01); *G01V 2210/6222* (2013.01)

(56) References Cited

U.S. PATENT DOCUMENTS

| | | | |
|---|---|---|---|
| 2008/0123468 A1 | 5/2008 | Akhmetsafin et al. | |
| 2008/0285382 A1 | 11/2008 | Valero et al. | |
| 2014/0064326 A1 | 3/2014 | Claussen et al. | |
| 2017/0176243 A1* | 6/2017 | Ellmauthaler | E21B 47/18 |
| 2017/0212274 A1 | 7/2017 | Sun et al. | |
| 2017/0242142 A1 | 8/2017 | Jiao et al. | |
| 2018/0203142 A1* | 7/2018 | Bouska | G01V 1/307 |

FOREIGN PATENT DOCUMENTS

| | | | |
|---|---|---|---|
| WO | 2016151037 | 9/2016 | |
| WO | WO-2016151037 A1 * | 9/2016 | ............... G01V 1/26 |
| WO | 2017172792 | 10/2017 | |

OTHER PUBLICATIONS

Office Action Summary for U.S. Appl. No. 16/484,507 dated Mar. 30, 2021.

Notice of Allowance for U.S. Appl. No. 16/484,507 dated Sep. 10, 2021.

* cited by examiner

SYSTEMS AND METHODS FOR HIGH-RESOLUTION TRAVEL TIME AND MOVE-OUT VELOCITY ESTIMATION USING DOWNHOLE LINEAR RECEIVER ARRAYS

TECHNICAL FIELD

The present description relates in general to borehole measurements using linear receiver arrays, and more particularly to, for example, without limitation, systems and methods for high-resolution travel time and move-out velocity estimation using downhole linear receiver arrays.

BACKGROUND

Challenges may arise when estimating travel time and move-out velocity using downhole linear receiver arrays. Travel time picking has various uses in borehole geophysics. An array of receivers associated with a wireline or LWD tool moving up or down the borehole acquires waveforms with signals generated from the firing of one or more transmitters. The properties of these signals may be analyzed to measure elastic and fluid dynamic properties about the mud, casing, and formation. One of these signal properties is the travel time of signals associated with different propagation paths from the transmitter to the receiver. These times depend on the elastic velocity and the length of the propagation paths, which permits travel times to be inverted for elastic velocity structure. The elastic velocity structure may form images that may assist with borehole stability planning, specifically regarding decisions about fluid sampling, horizontal drilling, fracking, perforating, and reservoir monitoring. Challenges may arise when estimating travel time and move-out velocity using downhole linear receiver arrays.

The description provided in the background section should not be assumed to be prior art merely because it is mentioned in or associated with the background section. The background section may include information that describes one or more aspects of the subject technology.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Figure 1A:
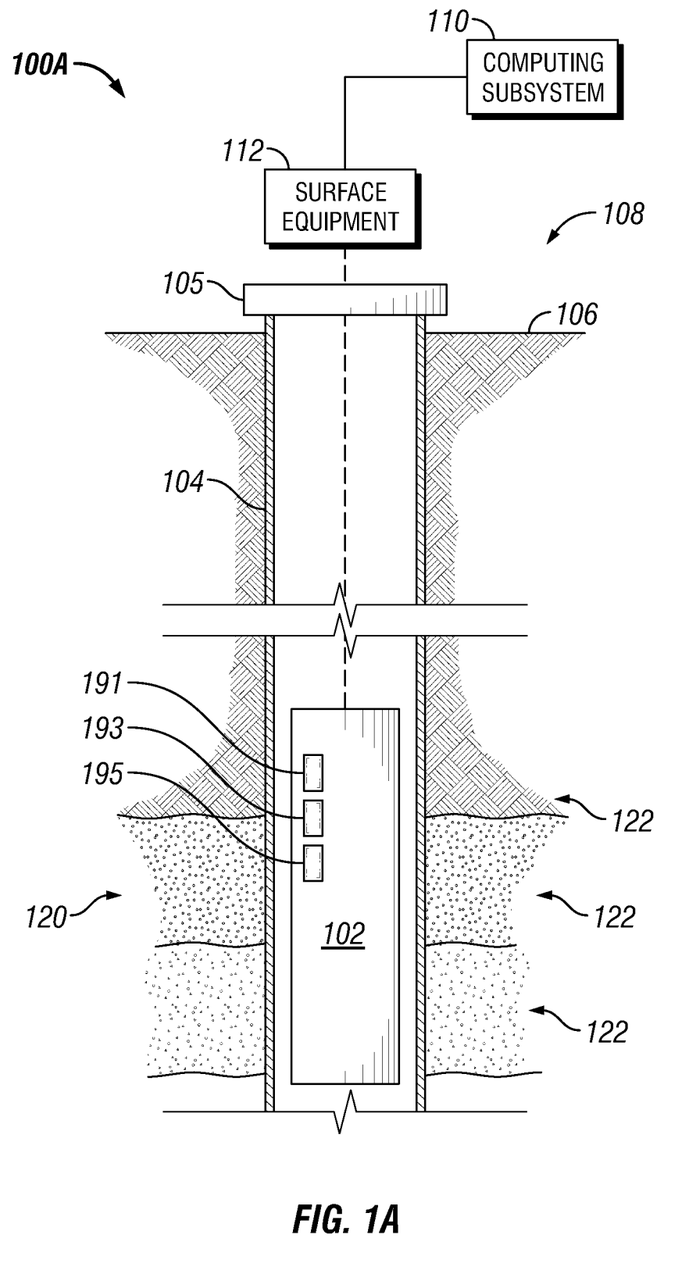
FIG. 1A is a diagram of an example well system, in accordance with aspects of the subject disclosure.

FIG. 1A is a diagram of an example well system 100a. Well system 100a includes measurement system 108 and a subterranean region 120 beneath the ground surface 106. A well system may include additional or different features that are not shown in FIG. 1A. For example, well system 100a may include additional drilling system components, wireline measurement system components, etc.

Subterranean region 120 may include all or part of one or more subterranean formations or zones. The example subterranean region 120 shown in FIG. 1A includes multiple subsurface layers 122 and a wellbore 104 penetrated through subsurface layers 122. Subsurface layers 122 may include sedimentary layers, rock layers, sand layers, or combinations of these and other types of subsurface layers. One or more of the subsurface layers may contain fluids, such as brine, oil, gas, etc. Although the example wellbore 104 shown in FIG. 1A is a vertical wellbore, measurement system 108 may be implemented in other wellbore orientations. For example, measurement system 108 may be adapted for horizontal wellbores, slanted wellbores, curved wellbores, vertical wellbores, or combinations of these.

The example measurement system 108 includes a measurement tool 102, surface equipment 112, and a computing subsystem 110. In the example shown in FIG. 1A, measurement tool 102 may be a downhole measurement tool that operates while disposed in wellbore 104. The example surface equipment 112 shown in FIG. 1A operates at or above surface 106, for example, near well head 105, to control measurement tool 102 and possibly other downhole equipment or other components of well system 100. The example computing subsystem 110 may receive and analyze measurement data from measurement tool 102. A measurement system may include additional or different features, and the features of a measurement system may be arranged and operated as represented in FIG. 1A or in another manner. In some instances, all or part of computing subsystem 110 may be implemented as a component of, or can be integrated with one or more components of, surface equipment 112, measurement tool 102 or both. In some cases, computing subsystem 110 may be implemented as one or more computing structures separate from surface equipment 112 and measurement tool 102.

In some implementations, computing subsystem 110 may be embedded in measurement tool 102, and computing subsystem 110 and measurement tool 102 may operate concurrently while disposed in wellbore 104. For example, although computing subsystem 110 is shown above surface 106 in the example shown in FIG. 1A, all or part of computing subsystem 110 may reside below surface 106, for example, at or near the location of the measurement tool 102.

Well system 100a can include communication or telemetry equipment that allows communication among computing subsystem 110, measurement tool 102, and other components of measurement system 108. For example, the components of measurement system 108 may each include one or more transceivers or similar apparatus for wired or wireless data communication among the various components. For example, measurement system 108 may include systems and apparatus for optical telemetry, wireline telemetry, wired pipe telemetry, mud pulse telemetry, acoustic telemetry, electromagnetic telemetry, or a combination of these and other types of telemetry. In some cases, measurement tool 102 receives commands, status signals, or other types of information from computing subsystem 110 or another source. In some cases, computing subsystem 110 receives measurement data, status signals, or other types of information from the measurement tool 102 or another source.

Measurement operations may be performed in connection with various types of downhole operations at various stages in the lifetime of a well system. Structural attributes and components of surface equipment 112 and measurement tool 102 may be adapted for various types of measurement operations. For example, measurement may be performed during drilling operations, during wireline measurement operations, or in other contexts. As such, surface equipment 112 and measurement tool 102 may include, or may operate in connection with drilling equipment, wireline measurement equipment, or other equipment for other types of operations.

Figure 1B:
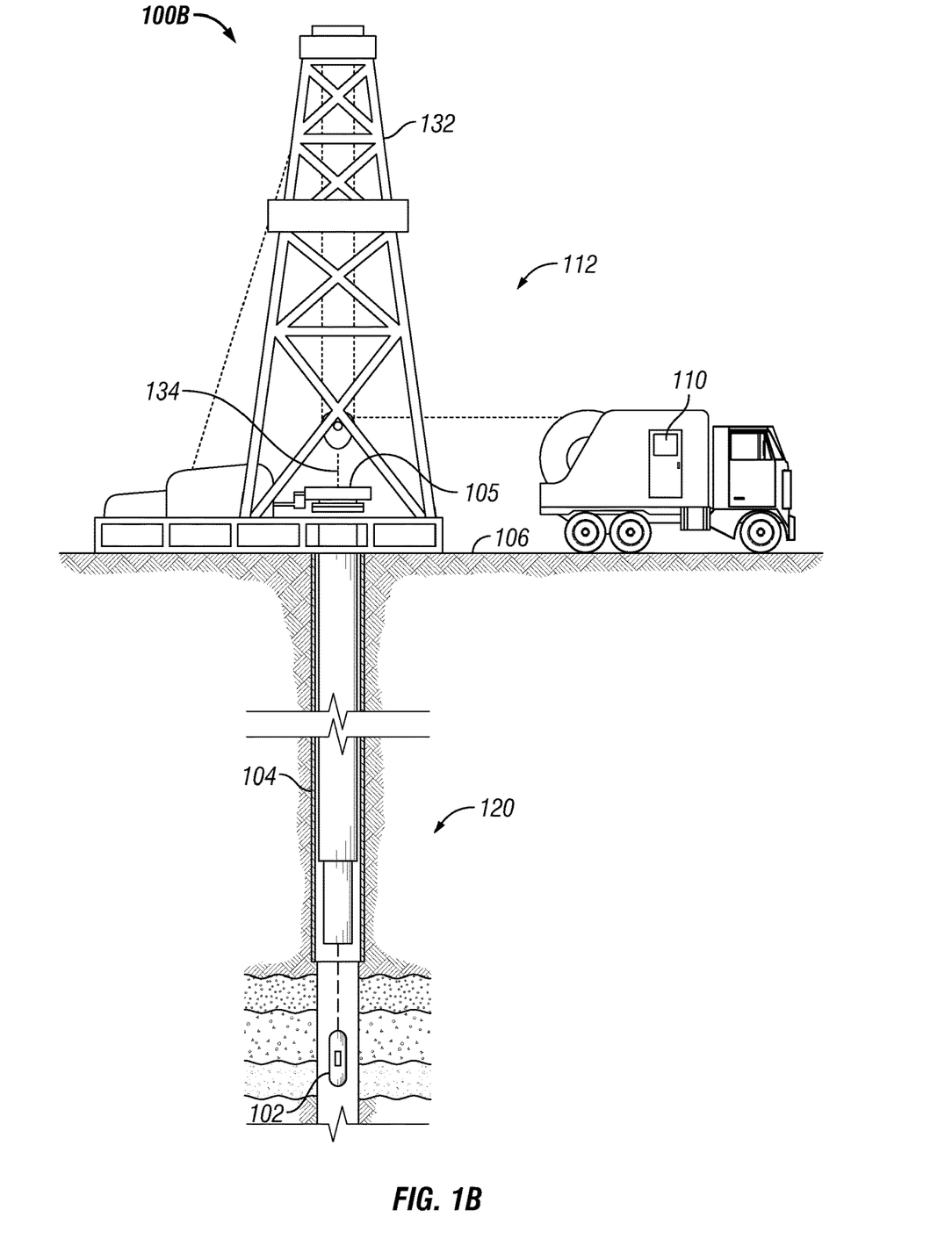
FIG. 1B is a diagram of an example well system that includes a measurement tool in a wireline measurement environment, in accordance with aspects of the subject disclosure.

In some examples, measurement operations may be performed during wireline measurement operations. FIG. 1B shows an example well system 100b that includes measurement tool 102 in a wireline measurement environment. In some examples, wireline measurement operations, surface equipment 112 includes a platform above surface 106 equipped with a derrick 132 that supports a wireline cable 134 that extends into wellbore 104. Wireline measurement operations may be performed, for example, after a drill string is removed from wellbore 104, to allow wireline measurement tool 102 to be lowered by wireline or measurement cable into wellbore 104.

Figure 1C:
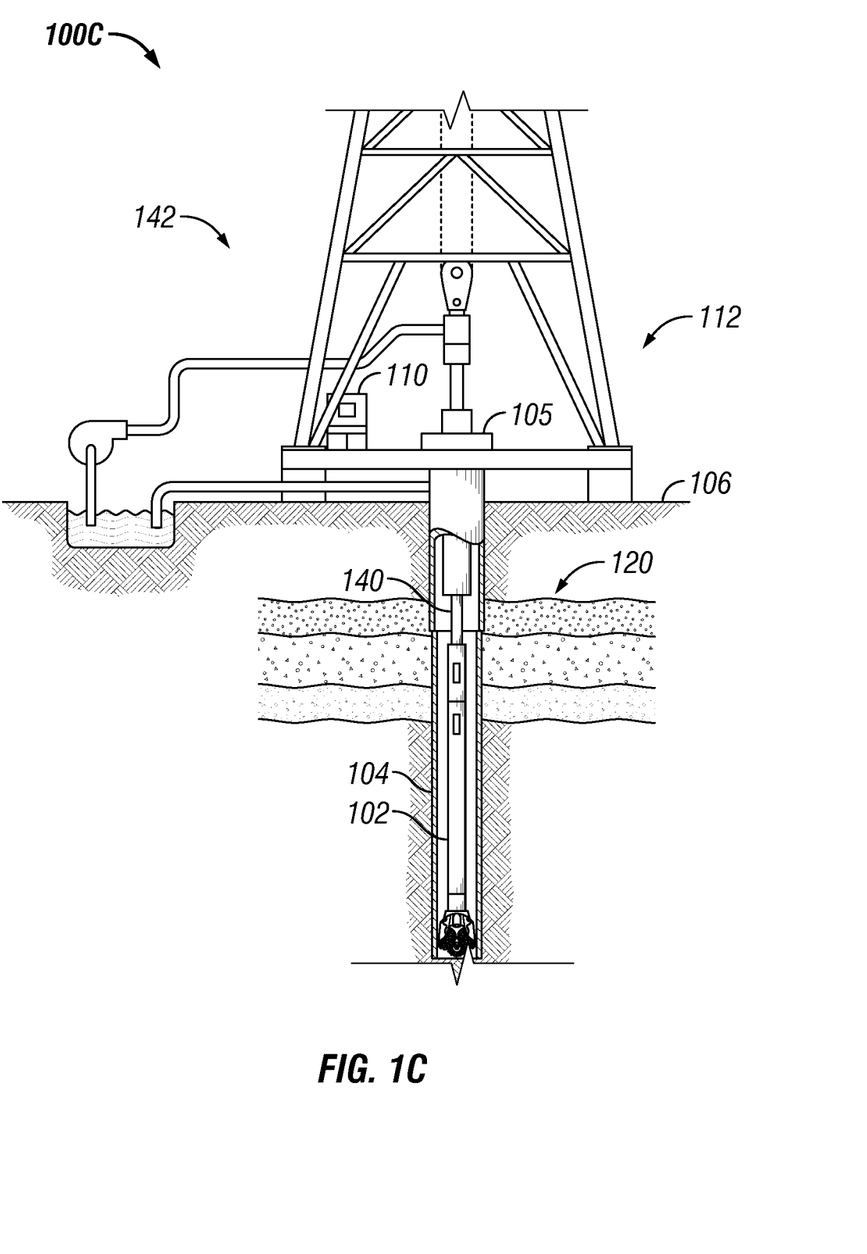
FIG. 1C is a diagram of an example well system that includes a measurement tool in a measurement while drilling (MWD) environment, in accordance with aspects of the subject disclosure.

In some examples, measurement operations may be performed during drilling operations. FIG. 1C shows an example well system 100c that includes measurement tool 102 in a measurement while drilling (MWD) environment. Drilling is commonly carried out using a string of drill pipes connected together to form a drill string 140 that is lowered through a rotary table into wellbore 104. In some cases, a drilling rig 142 at surface 106 supports drill string 140, as drill string 140 may operate to drill a wellbore penetrating subterranean region 120. Drill string 140 may include, for example, a kelly, drill pipe, a bottomhole assembly, and other components. The bottomhole assembly on the drill string may include drill collars, drill bits, measurement tool 102, and other components. The measurement tools may include measuring while drilling (MWD) tools, logging while drilling (LWD) tools, and others. In examples, measurement tool 102 may include one or more receivers 191, such as a linear array of receivers, one or more transmitters 193, and/or other sensor 195.

Travel time picking has various uses in borehole geophysics. An array of receivers associated with a wireline or LWD tool moving up or down the borehole acquires waveforms with signals generated from the firing of one or more transmitters. Although these transmitters may be acoustic or electromagnetic, this disclosure is written in the context of acoustic logging. The acoustic properties of these signals may be analyzed to measure elastic and fluid dynamic properties about the mud, casing, and formation. One of these signal properties is the travel time of signals associated with different propagation paths from the transmitter to the receiver. These times depend on the elastic velocity and the length of the propagation paths, which permits travel times to be inverted for elastic velocity structure. One method may be called "radial profiling," which results in a 2-D image of compressional slowness as a function of depth and radius into the formation. These images may be most useful to assist with borehole stability planning, specifically regarding decisions about fluid sampling, horizontal drilling, fracking, perforating, and reservoir monitoring.

In some aspects of borehole sonic logging technology, absolute travel times may be picked on two different receivers separated by about 2 feet (60 centimeters) used to estimate the delay time (DT) across the receiver pair. That single measurement may be made at each depth to estimate formation compressional velocity. This method may not be accurate, especially when road noise is high. Arrays of receivers filling in the 2 feet (60 centimeters) and extending out to 6 feet (180 centimeters) may be used instead, and semblance methods may be used to provide more accurate estimates of formation compressional velocity.

Semblance methods may be designed to track coherence across the receivers that are being used. Therefore, it may work well when the receiver array is smaller than the formation thickness. For example, as the receiver array crosses an interface between two formations, the semblance method may either (1) see two distinct velocities associated with both formations at roughly half the coherence of any single one of them or (2) see one velocity that is, unbeknownst to the analyst, an average velocity between the two formations. This may be problematic where there is interbedding between two layers that have thicknesses that are much smaller than the receiver array. For this scenario, symptom (1) presents the challenging problem because there are two velocities at each processed depth; it is difficult to determine the correct velocity log. In the same scenario, symptom (2) presents the problem that the interbedding may not be detected in the log data, and the resulting averaged velocity does not accurately describe either formation.

As disclosed below, two methods (an Instantaneous Phase (IP) method and a Cross Correlation (CC) method) may address the above identified problems. The two methods pick travel times of the first arriving compressional refracted wave with much greater accuracy than with traditional methods. Where road noise levels are high, these methods also provide reasonable picks, especially the CC method, where such picks were not possible using previous technologies before.

Furthermore, the two methods also naturally provide a means to estimate a compressional velocity over a narrow 6 inch (15 centimeter) depth range with sufficient accuracy if the acquisition of the tool is slow enough such that the depth acquisition sampling interval is no greater than the receiver spacing. These velocity logs have much greater vertical resolution, thereby removing the averaging or multi-valued problem of having two competing velocities at the current processing depth.

Figure 2:
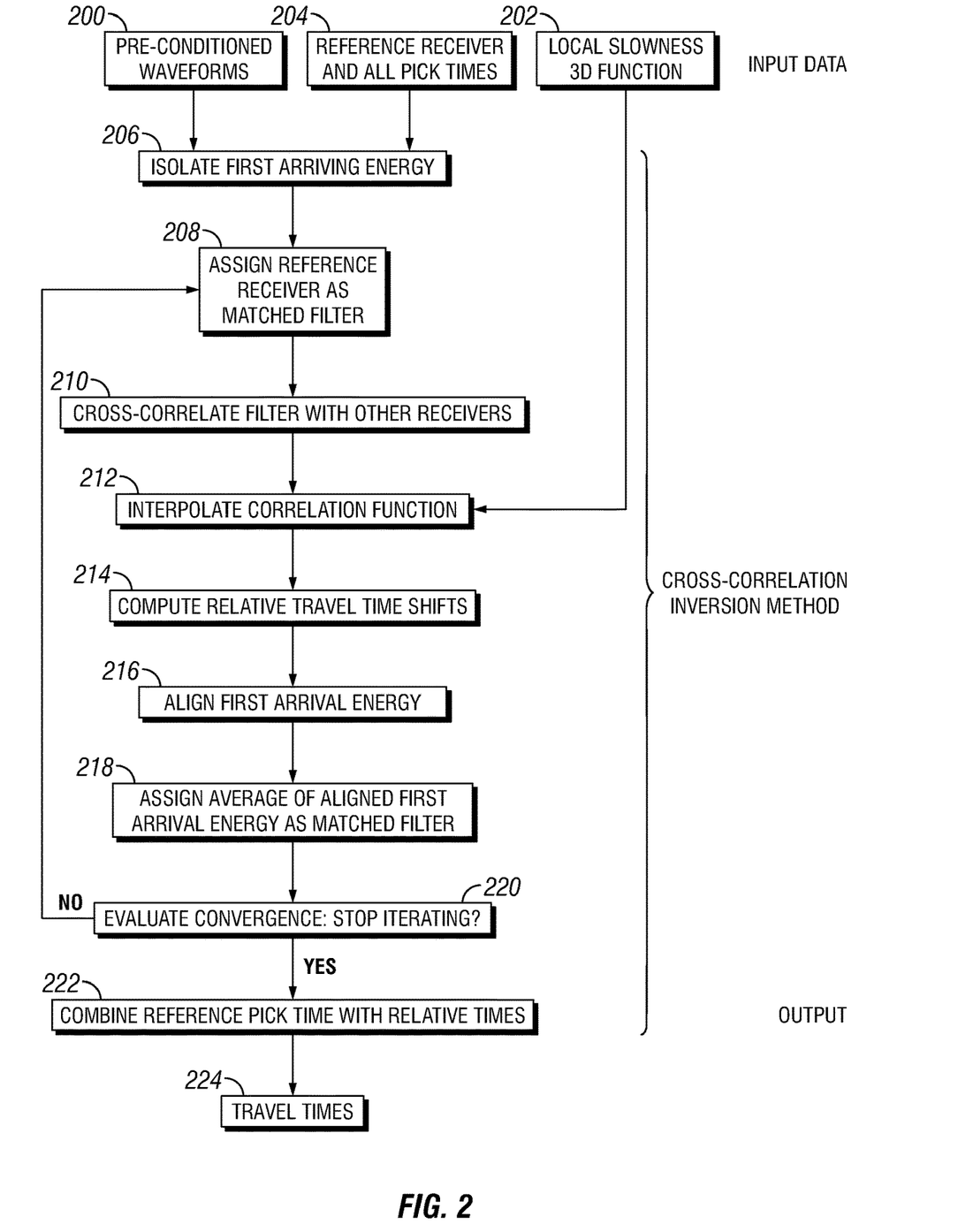
FIGS. 2-4 each show illustrative operations that may be performed for travel time estimation, in accordance with aspects of the subject disclosure.
Figure 3:
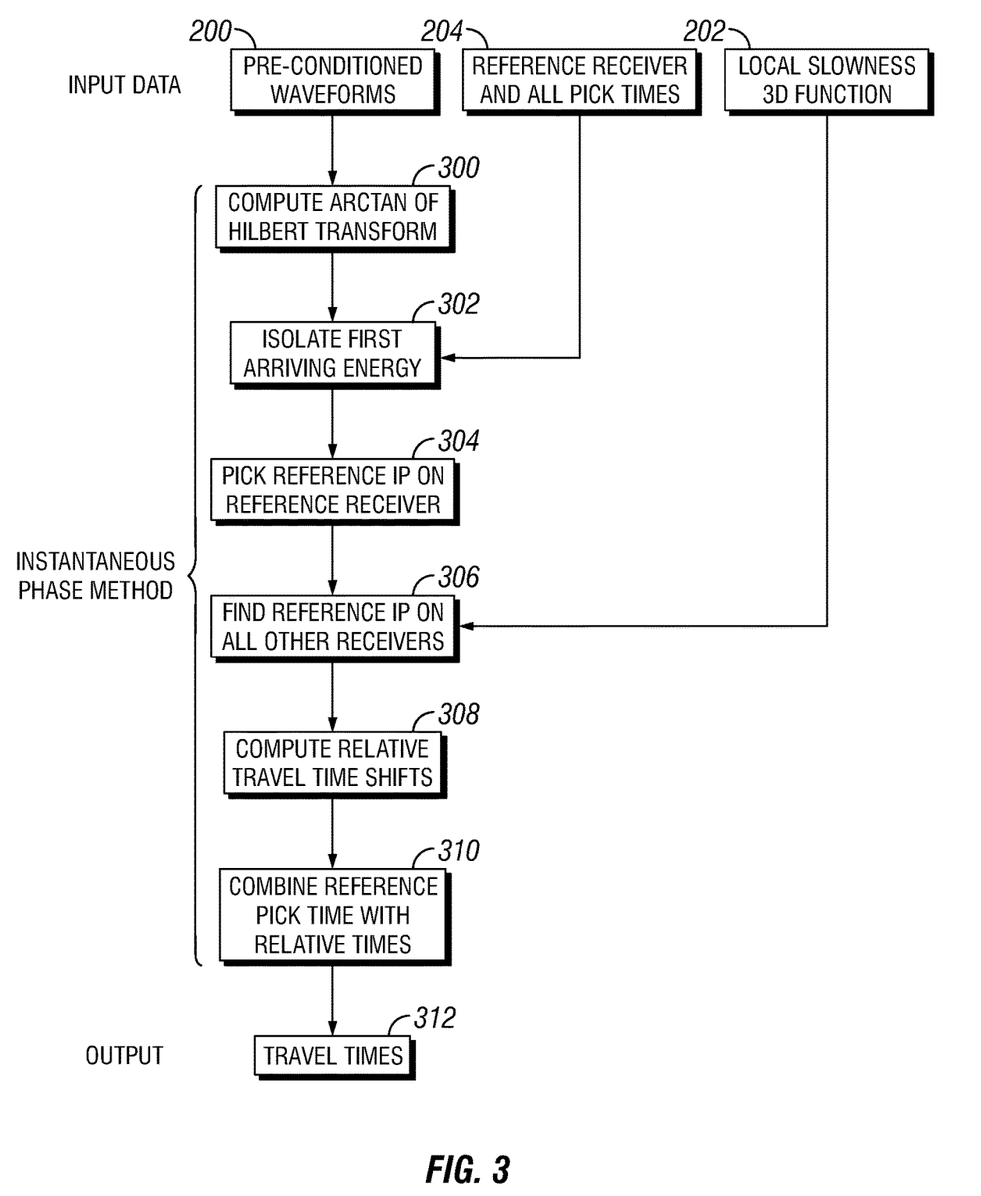
Figure 4:
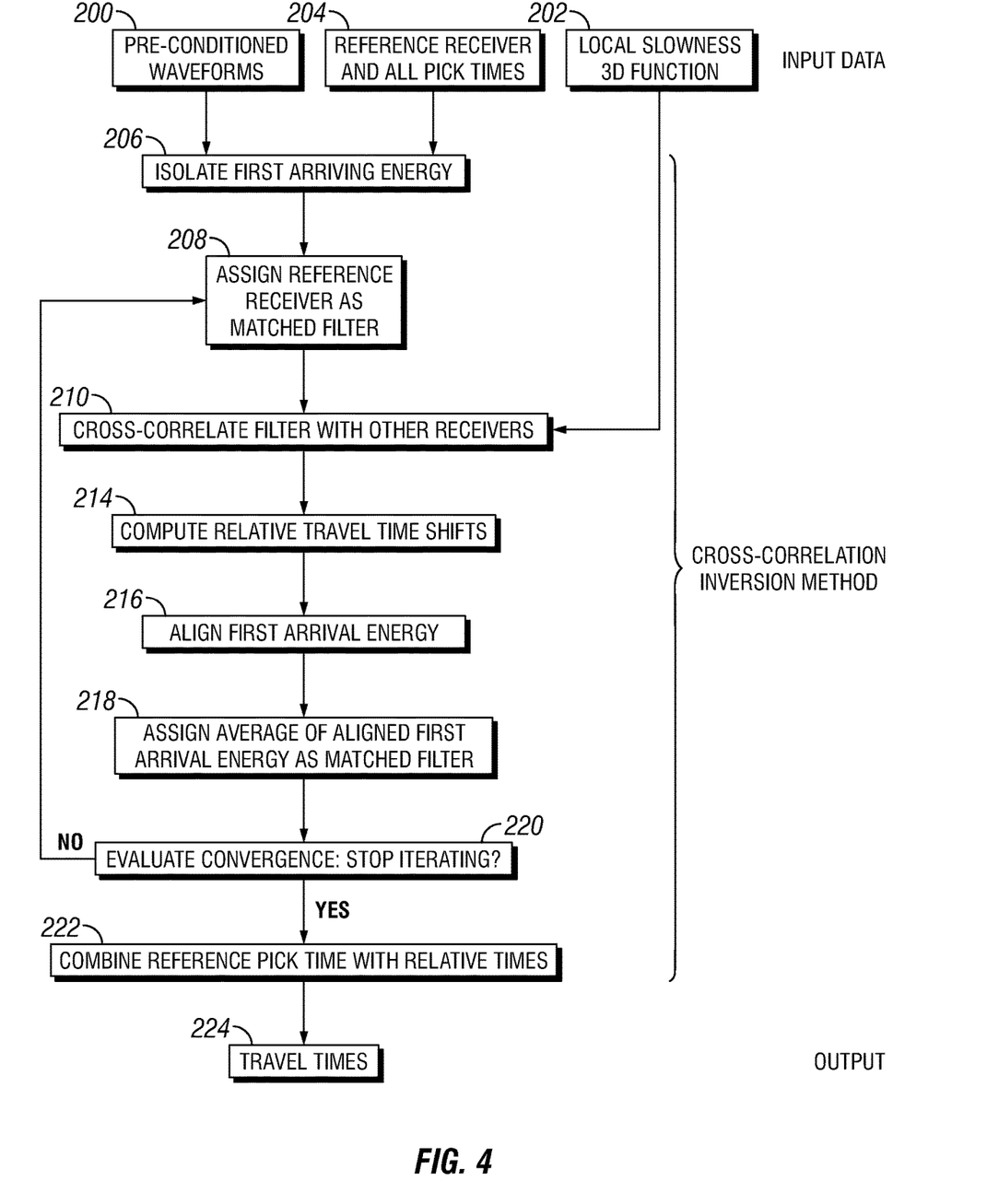

The methods are diagrammed in FIGS. 2-4. With reference to FIGS. 2-4, a first step 200 is to prepare preconditioned waveforms. In examples, may reduce random noise as well as eliminate or reduce the significance of dominant signals that are masking the signal of interest. The wavefield separation may be performed with any method, but the preferred embodiment is to use either an F-K filter or a Radon transform to preserve only signals with velocities that are within +/-20% of the input apparent velocity. One transforms the waveforms into the F-K or angle space, a pass band is defined, everything else is muted out, and the data are inverse transformed back into the time domain. Note that if the main data product of interest is the high-resolution velocity, then this wavefield separation filter may need to have a wider range of acceptable velocities, say +/-50%.

Regardless, this is followed by a band pass frequency filter to further isolate the signals of interest and increase the signal-to-noise ratio.

In step 202, a local slowness three-dimensional ("3D") function may be found. For example, in step 202 an operator may compute a 3D function of time, receiver index, and local slowness associated with the most coherent trial slowness. The idea is that each time sample in the receiver array is associated with numerous trial travel time curves, each curve having a total coherence value associated with it. The slowness at that particular time sample associated with the highest coherence is the "local slowness." This 3D function may be computed within the inner workings of many traditional beam forming and semblance methods.

In step 204, a reference receiver pick time may be found. For example, picking first arrivals using an edge detection method. The edge detection correctly finds a coarse resolution estimate of the arrival time for most of the receivers. The preferred embodiment is to use a STA/LTA (short term average over long term average) method on the envelope functions of the pre-conditioned waveforms. Aspects of this STA/LTA method are known to those skilled in the art. These edge detections have quality control ("QC") metrics associated with them. The edge detection that is ranked the highest in quality is considered the reference receiver.

At this point, there are two methods that may be used to compute the final travel times and velocity estimate: Instantaneous Phase (referred to herein as IP and illustrated in, for example, FIG. 3) and Cross Correlation inversion (referred to herein as CC and illustrated in, for example, FIG. 2 and/or FIG. 4). In the IP method, in step 300 an operator may compute an Arctan of a Hilbert Transform. In examples, a window is created at the reference receiver that surrounds the first arriving energy of the signal of interest. The instantaneous phase of all the receivers is computed, which is the arctangent of the Hilbert transform of the amplitude time series. In step 302 an operator may isolate first arriving energy with the reference receiver pick time from step 204. In step 304, an operator may pick reference IP on a reference receiver. In step 306 the operator may find reference IP on all other receivers. In examples, the phase is computed. For example, using the local slowness function from step 202, the predicted travel times at the adjacent receivers are computed. In step 308 the operator ma compute relative travel time shifts. For example, the method jumps to those receivers, and does a search for the original phase value. In step 310, the operator may combine reference pick time with relative times. For example, the local slowness is evaluated again and the leap frogging repeats until the originally picked phase has been tracked across the receiver array. This results in absolute travel times in step 312.

In the CC method, in step 206 an operator may isolate a first arriving energy. For example, a window is created around each edge detection's arrival time to isolate the first arriving energy of the signal of interest. In step 208 the operator may assign reference receiver as a matched filter. For example, the waveform in the reference receiver's window is used as a matched filter and in step 210 by cross-correlating it with all the other receivers first arrival waveforms in the array. The filter method is not restricted to cross-correlation; other matched filter technologies would work as well, such as deconvolution and phase-only filtering. In step 212, the operator may interpolate the correlation function. For example, each cross-correlation function is then interpolated and the top 3 peaks are picked. Each of these peaks are associated with three possible travel time shifts describing the velocity across a pair of receivers. That velocity that is the closest to the local slowness is selected. In examples, the selected local slowness 3D function in step 202 may be used in step 212 to interpolate a correlation function. In step 214, an operator may computer relative travel time shifts. For example, all the waveforms may be shifted by these travel times and averaged to create a new matched filter waveform. As illustrated in FIG. 4, step 212 to interpolate a correlation function may be removed and the local slowness 3D function found in step 202 may be used in step 214 to compute relative travel time shifts. In step 216 the operator may align a first arrival energy. In step 218 the operator may assign an average of aligned first arrival energy as a matched filter. In step 210, the operator may evaluate convergence. For example, the process may be repeated until a convergence criterion is met or a maximum number of iterations has been performed. The two preferred convergence criterions are when the average correlation coefficient across the array has been maximized and when the time shift updates has been minimized. The final list of relative travel times is very accurate on account of (1) cross-correlation uses more than one time sample in each receiver to determine correlation and (2) the cross-correlation functions are up-sampled providing subsample accuracy. These relative times lead to the most accurate high-resolution velocity estimate of the two methods. In step 222, the operator may combine a reference pick time with relative times. For example, relative times may be combined with the absolute travel time pick from the reference receiver to result in absolute travel time picks in step 224.

At this point, accurate travel times may be provided that may be immediately used. However, there are occasions where outliers will result. This may happen for a number of reasons. Thus the next step is to remove outliers. There are a number of ways to do this depending on the acquisition geometry and process. For many borehole logging applications, a fixed size array is provided that is moving up the borehole acquiring data at a periodic rate at which a transmitter is fired. Therefore, travel time picks may be stored corresponding to a depth range into the past. These outliers may be detected by depth-aligning pairs of receivers associated with the firings in the buffer. Outlier travel times may be associated with velocities that may be different from the median velocity of the other pairs at that depth. Once outliers are identified, they may be either removed or corrected. Note that this outlier rejection method preserves vertical resolution whereas a traditional depth "smoothing" filter does not.

The final step is particularly relevant to receiver arrays that are moving and periodically acquiring data. One may average the differences in travel time across the depth-aligned receiver pairs. This will result in a slowness value that has a vertical resolution equal to the spacing of the receiver array, which for acoustic logging is typically 6". The QC metric for this slowness log is simply the standard deviation of the depth-aligned slowness values. Since each receiver pair has an associated source-receiver offset, and since slowness should vary as a function of offset for radial velocity gradients, in examples the slownesses as a function of offset as a way to QC radial profiling results In accordance with various aspects, this disclosure addresses two problems. The first is the problem of estimating the time of arrival of impulsive signals recorded by an array of receivers. Some methods use edge detection as a means to detect the onset or "rise time" of an arrival as it is coincident with the timing of an amplitude rises above background noise. The accuracy of this method may be limited to half the sampling rate of the waveforms. Edge detection may be dependent on the background noise level, which from one receiver to the next may lead to inaccuracies that are either small or very large.

The second problem is that of estimating the apparent velocity of these signals as they cross the array. The apparent velocity is simply the distance between two receivers divided by the time it takes the signal recorded on one receiver to be detected on the adjacent receiver. In borehole acoustic logging, this apparent velocity is equivalent to the formation compressional and shear wave velocities when the signals are from refracted waves.

Some methods use beam forming or semblance processing methods to estimate velocity. These methods look for the alignment of coherent energy along trial velocity move-out curves either from one time sample to the next (e.g. differential phase) or within a small window (e.g. standard time coherence). The benefit of these methods may be mitigating the effects of noise. However, they only work well when there is no variation in velocity across the array. In borehole environments, it is quite common to find geological beds with thicknesses that are smaller than the aperture of the receiver array. When this happens, depending on the velocities and signal frequencies, one either measures a single average velocity (not knowing multiple beds exist), or multiple velocities simultaneously (which requires figuring out which one is the best one to pick for that depth). Reducing the aperture of the array helps reduce this problem, but this improvement is limited because as one reduces the aperture of the array, the signal-to-noise level goes down as well. In borehole conditions with little road noise, these methods typically benefit from no less than 5 receivers, which is about 2 inches (5 centimeters) in length. In high road noise conditions, 5-receiver semblance results provide poor results unless some sort of advanced stacking method is used.

In accordance with various aspects, this disclosure addresses both of these two problems by introducing two independent methods (IP and CC), each method of which provides both a more accurate travel time estimate as well as an estimate of the velocity across pairs of receivers, which has a vertical resolution of the spacing of the receivers. For typical borehole acoustic (0.5-20 kHz) data, this translates to an absolute travel time and slowness accuracy of within, for example, ~0.5 μs and ~0.25 μs/ft, with a vertical resolution of ~6 inches (15 centimeters).

In accordance with various aspects, this disclosure describes a workflow, with two separate methods at the core of the workflow. The inputs are the waveforms recorded across a receiver array and an estimate of the apparent velocity of the signal of interest across the array, say from a coarse-resolution semblance method. The outputs are the travel times and the apparent slowness at the locations between the pairs of adjacent receivers.

The method works by first performing a wavefield separation to isolate the signal of interest. The general velocity of the signal across the array is known and/or stored. This velocity may be used to construct the wavefield separation filter to attenuate coherent signals with velocities that are different as well as random noise, such as that which occurs due to stick/slip of a tool in a deviated well.

The next step is to estimate at each time sample a "local slowness." This may not be exactly the slowness at that point, but essentially an average across several receivers. The next step is to perform an edge detection method to approximate the travel times on all receivers of the first arriving energy. Then these travel times are updated in one of two ways. The Instantaneous Phase (IP) method tracks a picked reference instantaneous phase across the array. The Cross Correlation (CC) Inversion method tracks the coherence of the first arriving energy across the array with subsample precision using interpolation of cross-correlation functions in an iterative loop to maximize the average correlation coefficient across the array or minimize the different in travel time shifts from one iteration to the next. Both methods use the local slowness function for guidance and result in relative travel time shifts that may be combined with the absolute time provided from a reference receiver to form the final travel times.

The disclosed methods above may be generalized for any receiver array. For linear receiver arrays that are moving along the direction of the array azimuth, such as that used in Wireline and LWD sonic logging, these travel times may be stored and analyzed to capitalize on the redundancy of data acquired, providing the array moves at a speed no greater than one acquisition per receiver spacing. Specifically, the receiver pairs that happen to occur when they are at a common location may be aligned. When in that sorted space, the difference across the receivers should be the same, under the assumption of a homogeneous propagation medium. This provides a natural way to remove outliers without needing to reduce vertical resolution by using a smoothing function. During this step, the average of these depth-aligned travel time differences is determined and converted into a velocity log with a resolution equal to the receiver spacing.

In accordance with various aspects, the subject disclosure provides the following features which may not be known in currently in technology. For example, use of interpolated cross-correlation functions in an inversion for accurate travel time and velocity estimation, Computation of local slowness at each waveform time sample across the receiver array, use of depth-aligned receiver pairs to detect outliers and reject them without suffering vertical resolution, use of instantaneous phase to track travel times across an array, and/or combination of the above identified features with wavefield separation to measure absolute travel times In accordance with various aspects, the features 1-5 noted above can provide wireline borehole acoustic logging improvements for vertical wells with both the IP and CC methods for travel time and apparent velocity estimation relative to edge detection methods.

In deviated wells where there is additional road noise, the edge detection method has a very difficult time picking accurate travel times. Noisy travel times may prevent a tomographic algorithm from yielding reasonable results. Using the output of both new methods disclosed herein as the input to the tomographic algorithm can provide improved tomographic images.

In accordance with various aspects, the features 1-5 noted above may allow radial profiling inversions where they were not possible in the past, as well as make radial profiling results more accurate. Improved decisions based on radial profiling results may thus be made.

In accordance with various aspects, the features 1-5 noted above may provide improvements for real-time and post-processing sonic logging service for compressional slowness and related inferred properties (like sonic porosity) for XSI, XAST, and BSAT at a resolution between about 6 feet (180 centimeters) and about 2 feet (60 centimeters), depending on the size of the receiver array that is selected for processing. Each of these tools have approximately 6 inch (15 centimeter) receiver spacing, but spacing can vary for example, from about 2 inches (5 centimeters) to about 18 inches (46 inches). The two methods in this disclosure, especially the CC method, provide a new formation DTC log with inches (15 centimeter) resolution that may be used with all 3 tools. Comparison with the enhanced-vertical resolution Gamma Ray log in a well with interbedded sandstones and shale shows the method is accurate and works well.

In accordance with various aspects, the features 1-5 noted above may provide improvements for HTI algorithms. One of the important tasks to getting the correct HTI answer is to estimate the onset of the arrival of the flexural wave. This sets the small window on the first few low-frequency cycles of the flexural wave, which is then analyzed for shearwave splitting. It is important not to get Stoneley wave contamination in this window. The correct window selection can be optimized and automated by using the Local Slowness 3D Function proposed in this disclosure.

Various examples of aspects of the disclosure are described below as clauses for convenience. These are provided as examples, and do not limit the subject technology.

Clause A. A method, comprising: receiving one or more signals from a linear receiver array, and estimating a travel time associated with the signal using an Instantaneous Phase method.

Clause B. A method, comprising: receiving one or more signals from a linear receiver array, and estimating a travel time associated with the signal using a Cross Correlation Inversion method.

In one or more aspects, examples of additional clauses are described below.

A method comprising one or more methods, operations or portions thereof described herein.

An apparatus comprising one or more memories and one or more processors (e.g., 210), the one or more processors configured to cause performing one or more methods, operations or portions thereof described herein.

An apparatus comprising one or more memories (e.g., one or more internal, external or remote memories, or one or more registers) and one or more processors coupled to the one or more memories, the one or more processors configured to cause the apparatus to perform one or more methods, operations or portions thereof described herein.

An apparatus comprising means adapted for performing one or more methods, operations or portions thereof described herein.

A processor comprising modules for carrying out one or more methods, operations or portions thereof described herein.

A hardware apparatus comprising circuits configured to perform one or more methods, operations or portions thereof described herein.

An apparatus comprising means adapted for performing one or more methods, operations or portions thereof described herein.

An apparatus comprising components operable to carry out one or more methods, operations or portions thereof described herein.

A computer-readable storage medium (e.g., one or more internal, external or remote memories, or one or more registers) comprising instructions stored therein, the instructions comprising code for performing one or more methods or operations described herein.

A computer-readable storage medium (e.g., one or more internal, external or remote memories, or one or more registers) storing instructions that, when executed by one or more processors, cause one or more processors to perform one or more methods, operations or portions thereof described herein.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Unless otherwise specified, terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A method for borehole measurements, comprising:
receiving one or more signals from a linear receiver array;
isolating a first arriving energy;
selecting a reference instantaneous phase on a reference receiver;
finding the reference instantaneous phase for the linear receiver array;
computing a relative travel time shift;
combining a reference pick time with a relative time; and
determining a travel time.

2. The method of claim 1, further comprising computing pre-conditioning waveforms.

3. The method of claim 2, wherein computing the pre-conditioning waveforms further comprises computing an arctan of a Hilbert Transform.

4. The method of claim 1, further comprising identifying a reference receiver pick time.

5. The method of claim 4, wherein the isolating a first arriving energy is isolated with the reference receiver pick time.

6. The method of claim 1, further comprising computing a local slowness three dimensional function.

7. The method of claim 6, wherein the finding the reference instantaneous phase for the linear receiver array is found with the local slowness three dimensional function.

8. A method for borehole measurements, comprising:
receiving one or more signals from a linear receiver array;
isolating a first arriving energy;
assigning a reference receiver as a matched filter;
performing a cross-correlate filter with one or more receivers;
computing a relative travel time shift;
aligning a first arrival energy;
combining a reference pick time with a relative time; and
determining a travel time.

9. The method of claim 8, further comprising interpolating a correlation function.

10. The method of claim 9, further comprising computing a local slowness three dimensional function.

11. The method of claim 10, wherein the interpolating the correlation function is found with the local slowness three dimensional function.

12. The method of claim 8, further comprising pre-conditioning waveforms.

13. The method of claim 12, further comprising identifying a reference receiver pick time.

14. The method of claim 13, wherein the isolating the first arriving energy is computed with the pre-conditioning waveforms and the reference receiver pick time.

15. The method of claim 8, further comprising computing a local slowness three dimensional function.

16. The method of claim 15, wherein the computing the relative travel time shift is computed with the local slowness three dimensional function.

17. A system for borehole measurements comprising:
a conveyance;
a bottom hole assembly attached to the conveyance;
a linear receiver array, wherein the linear receiver array is disposed on the bottom hole assembly; and
a computer system connected to the linear receiver array and configured to:
isolate a first arriving energy;
select a reference instantaneous phase on a reference receiver;
find the reference instantaneous phase for the linear receiver array;
compute a relative travel time shift;

combine a reference pick time with a relative time; and
determine a travel time.

18. The system of claim 17, wherein the conveyance is a wireline or a drill string.

19. The system of claim 17, wherein the computer system is further configured to identify a reference receiver pick time.

20. The system of claim 19, wherein the isolating a first arriving energy is isolated with the reference receiver pick time.

* * * * *